United States Patent
Finger et al.

(10) Patent No.: US 11,440,236 B2
(45) Date of Patent: Sep. 13, 2022

(54) SYSTEM AND METHOD FOR PROCESSING CONTAINERS WITH MONITORING OF DRIVE MOTORS

(71) Applicant: KRONES AG, Neutraubling (DE)

(72) Inventors: Dieter Finger, Neutraubling (DE); Thomas Kitzinger, Regensburg (DE)

(73) Assignee: KRONES AG, Neutraubling (DE)

( * ) Notice: Subject to any disclaimer, the term of this patent is extended or adjusted under 35 U.S.C. 154(b) by 1123 days.

(21) Appl. No.: 15/781,584

(22) PCT Filed: Dec. 6, 2016

(86) PCT No.: PCT/EP2016/079874
§ 371 (c)(1),
(2) Date: Jun. 5, 2018

(87) PCT Pub. No.: WO2017/102432
PCT Pub. Date: Jun. 22, 2017

(65) Prior Publication Data
US 2020/0262127 A1    Aug. 20, 2020

(30) Foreign Application Priority Data
Dec. 16, 2015   (DE) .................. 10 2015 122 003

(51) Int. Cl.
  *B29C 49/42*  (2006.01)
  *B29C 49/64*  (2006.01)
  (Continued)

(52) U.S. Cl.
  CPC ...... *B29C 49/4205* (2013.01); *B29C 49/6409* (2013.01); *B29C 49/6436* (2013.01); *B29C 49/78* (2013.01); *B29L 2031/7158* (2013.01)

(58) Field of Classification Search
  CPC ............ B29C 49/4205; B29C 49/6409; B29C 49/6436; B29C 49/78
  See application file for complete search history.

(56) References Cited

U.S. PATENT DOCUMENTS

| 4,420,670 A | 12/1983 | Croswell et al. |
| 6,769,895 B2 | 8/2004 | Derouault et al. |

(Continued)

FOREIGN PATENT DOCUMENTS

| CN | 1406176 | 3/2003 |
| CN | 1424962 | 6/2003 |

(Continued)

OTHER PUBLICATIONS

German European Search Report dated Aug. 19, 2016, issued in corresponding European Application No. 102015122003.2.

(Continued)

*Primary Examiner* — Robert B Davis
(74) *Attorney, Agent, or Firm* — Onello & Mello, LLP

(57) ABSTRACT

A system for processing containers with a transport device which transports the containers along a predetermined transport path, wherein a plurality of holding devices for holding the containers is arranged on the transport device, wherein the system has at least one rotating device which rotates the plastic parisons with regard to a rotational position with respect to the longitudinal directions thereof. According to the invention the rotating device has an electrically operated driving device for producing the rotary movement of the plastic parisons with respect to the longitudinal directions thereof as well as at least one measuring device, which at least at times determines at least an electrical characteristic quantity of this driving device.

11 Claims, 1 Drawing Sheet

(51) Int. Cl.
  *B29C 49/78*  (2006.01)
  *B29L 31/00*  (2006.01)

(56) References Cited

U.S. PATENT DOCUMENTS

| | | | |
|---|---|---|---|
| 8,544,636 | B2 | 10/2013 | Zoppas et al. |
| 8,620,062 | B2 | 12/2013 | Kwirandt |
| 8,684,725 | B2 | 4/2014 | Schmitt et al. |
| 9,283,709 | B2 | 3/2016 | Lindner et al. |
| 9,393,732 | B2 | 7/2016 | Winzinger |
| 2003/0077349 | A1 | 4/2003 | Derouault et al. |
| 2003/0138512 | A1 | 7/2003 | Girotto et al. |
| 2009/0294069 | A1* | 12/2009 | Kramer .................. B65C 9/06 156/362 |
| 2011/0114452 | A1 | 5/2011 | Zoppas et al. |
| 2012/0080817 | A1 | 4/2012 | Schmitt et al. |
| 2012/0089252 | A1 | 4/2012 | Kwirandt |
| 2015/0079220 | A1 | 3/2015 | Lindner et al. |
| 2015/0083364 | A1 | 3/2015 | Winzinger |
| 2015/0111162 | A1 | 4/2015 | Huettner et al. |

FOREIGN PATENT DOCUMENTS

| | | |
|---|---|---|
| CN | 2017288350 | 2/2011 |
| CN | 102152469 | 8/2011 |
| CN | 102555195 | 7/2012 |
| CN | 104552893 | 4/2015 |
| DE | 10220164 | 10/2003 |
| DE | 102013109174 | 2/2015 |
| DE | 102013218399 | 3/2015 |
| EP | 2253452 | 11/2010 |
| EP | 2439490 | 4/2012 |
| EP | 2862694 | 4/2015 |
| GB | 2116789 | 9/1983 |

OTHER PUBLICATIONS

International Search Report dated Feb. 28, 2017, issued in corresponding International Application No. PCT/EP2016/079874.
Chinese Office Action dated Dec. 3, 2019 issued in corresponding Chinese Application No. 201680073730.1, with English translation.
Chinese Office Action dated Jul. 27, 2020 issued in corresponding Chinese Application No. 201680073730.1, with English translation.
Third Party Appeal dated Oct. 26, 2021 issued in corresponding European Application No. 16808988.6.
Citation No. 009 in opposition procedure: Abnahmeprotokoll.
Citation No. 010 in opposition procedure: SAP Auszug Maschine.
Citation No. 011 in opposition procedure: SAP Auszug Heizsystem.
Citation No. 012 in opposition procedure: SAP Auszug Heizmodul.
Citation No. 013 in opposition procedure: Zeichnung Heizmodul.
Citation No. 014 in opposition procedure: Auszug Betriebsanleitung Seite 45.
Citation No. 015 in opposition procedure: Auszug Betriebsanleitung Seite 49.
Citation No. 016 in opposition procedure: SAP Auszug Heizsystem.
Citation No. 017 in opposition procedure: SAP Auszug Frequenzumrichter.
Citation No. 018 in opposition procedure: SAP Auszug Frequenzumrichter Details.
Citation No. 019 in opposition procedure: E-Plan Seite 1.
Citation No. 020 in opposition procedure: E-Plan Seite 428.
Citation No. 021 in opposition procedure: E-Plan Seite 221.
Citation No. 022 in opposition procedure: Produkthandbuch Frequenzumrichter.
Citation No. 023 in opposition procedure: Produktbroschure Frequenzum?ichter.
Citation No. 024 in opposition procedure: Projektierungshandbuch Frequenzumrichter.
Citation No. 025 in opposition procedure: Auszug Betriebsanleitung Seite 196.
Citation No. 026 in opposition procedure: kapitelweise Betriebsanleitung.
Citation No. 027 in opposition procedure: Abnahmeprotokoll.
Citation No. 028 in opposition procedure: Inspektionsprotokoll.
Citation No. 029 in opposition procedure: SAP Auszug Maschine.
Citation No. 030 in opposition procedure: SAP Auszug Heizsystem.
Citation No. 031 in opposition procedure: SAP Auszug Heizmodul.
Citation No. 032 in opposition procedure: Zeichnung Heizmodul.
Citation No. 033 in opposition procedure: Auszug Betriebsanleitung Seite 45.
Citation No. 034 in opposition procedure: Auszug Betriebsanleitung Seite 49.
Citation No. 035 in opposition procedure: SAP Auszug Heizsystem.
Citation No. 036 in opposition procedure: SAP Auszug Frequenzumrichter.
Citation No. 037 in opposition procedure: SAP Auszug Frequenzumrichter Details.
Citation No. 038 in opposition procedure: E-Plan Seite 1.
Citation No. 039 in opposition procedure: E-Plan Seite 460.
Citation No. 040 in opposition procedure: E-Plan Seite 223.
Citation No. 041 in opposition procedure: Produkthandbuch Frequenzumrichter.
Citation No. 042 in opposition procedure: Produktbroschure Frequenzum?ichter.
Citation No. 043 in opposition procedure: Projektierungshandbuch Frequenzumrichter.
Citation No. 044 in opposition procedure: Auszug Betriebsanleitung Seite 189.
Citation No. 045 in opposition procedure: kapitelweise Betriebsanleitung.
Consolidated list of references cited in opposition procedure, downloaded from file wrapper for corresponding European Application No. 16808988.6.

* cited by examiner

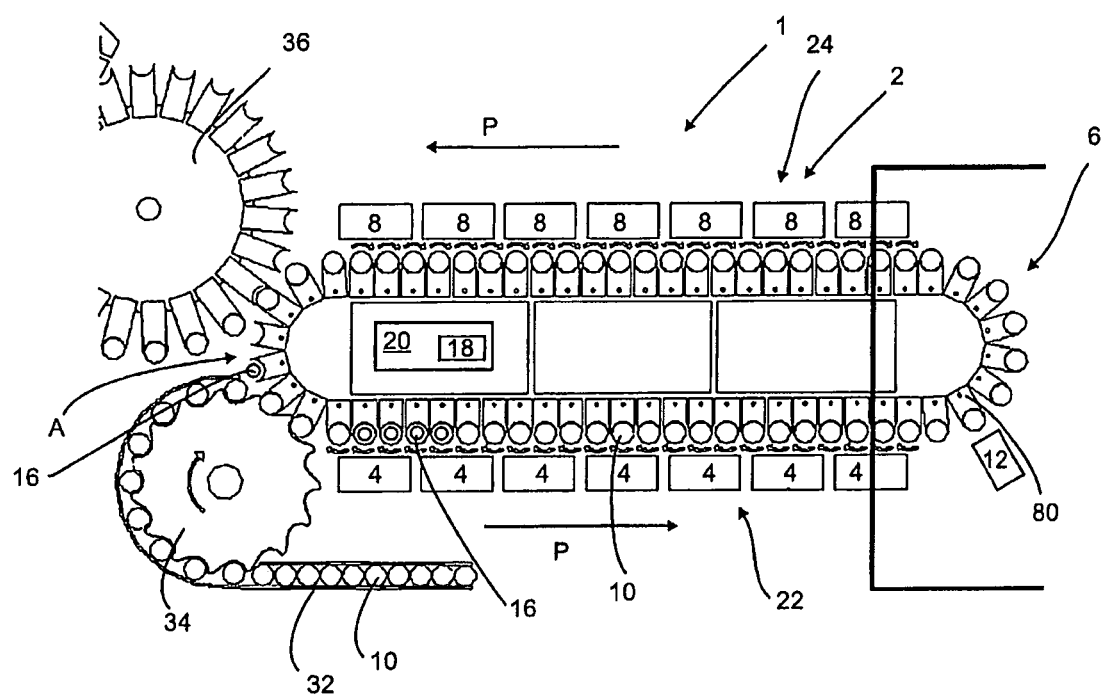

SYSTEM AND METHOD FOR PROCESSING CONTAINERS WITH MONITORING OF DRIVE MOTORS

The present invention relates to a system and a method for processing containers. The invention is described with reference to an oven which heats plastic parisons. However, it is also pointed out that the invention can also be used in other machines or methods, in particular in machines which employ stepping motors for setting rotated positions and/or which have a plurality of substantially similar drives, which carry out mechanical movements, in particular rotary movements and/or linear movements (such as, for example, lifting movements).

It has been known for a long time from the prior art to heat plastic parisons and to transform these heated plastic parisons into plastic containers by means of a transforming device, such as for example a stretch blow moulding machine. For this purpose, in the prior art the plastic parisons are moved through an oven and during this transport they are heated by heating elements which are in particular arranged in a stationary manner. In this case systems and methods are also known from the prior art in which a thermal profile which changes in the circumferential direction is applied to the plastic parisons. By such methods, in a subsequent blow moulding process containers are produced which have a profile which deviates from a circular profile.

Two different methods for applying such an alternating thermal profile are currently known in the prior art. Thus, on the one hand it is known to apply a radially non-identical heating profile to the plastic parison in the heating oven in a so-called "preferential heating" method. It is also known from the prior art to cool the plastic parison in some portions, or partially, by subsequent devices or after the oven in an intermediate module. Due to this non-identical heating profile it is possible to produce oval shaped bottles.

If in addition to the oval bottle an oval closure is also to be used, the closure should be aligned with the container after closing. For this reason, the thread pitch of the container always start at precisely the same location. In order to achieve this, it is known in the prior art that the plastic parison has a marking, for example in the form of a notch. A first camera before the actual processing starwheel measures the angular position of the notch. Next the mandrel with the plastic parison is aligned by a drive, such as for instance a stepping motor, which is preferably installed in every station. Then the stamping operation begins (for example with cooling plates). After partial cooling, the plastic parison is further rotated again, so that the plastic parison is aligned with a specific position, for example the parting line of the blow mould.

In this case it is important that a fault at one station, which leads to the plastic parison being incorrectly rotated (for example a stuck bearing), is reliably recognised. In this connection it is known from the applicant's own prior art that a second camera is installed after the processing starwheel and monitors the angular position of the marking. In addition, it would be possible to equip each individual station or each holding device with an encoder system which monitors the alignment. However, these solutions are in each case associated with very high costs.

Therefore, the object of the present invention is to provide a system and a method which enable such monitoring in such systems more simply and/or more cost-effectively. These objects are achieved according to the invention by the subject matters of the independent claims. Advantageous embodiments and further developments form the subject matter of the subordinate claims.

A system according to the invention for processing containers has a transport device which transports the containers along a predetermined transport path. In this case a plurality of holding devices for holding the containers is arranged on the transport device. Furthermore, the system has a rotating device which rotates the plastic parisons with regard to a rotational position with respect to the longitudinal axes thereof.

According to the invention the rotating device has an electrically operated driving device for producing the rotary movement of the plastic parisons with respect to the longitudinal directions thereof as well as at least one measuring device, which at least at times determines an electrical characteristic quantity of this driving device. In particular the measuring device determines the electrical characteristic quantity in order to deduce therefrom whether the rotating device is capable of carrying out a desired rotary movement.

It is pointed out that the containers described here may be both empty containers, full containers but in particular also so-called plastic parisons, from which plastic containers such as plastic bottles can be produced later. These containers can also be made of different materials such as in particular, but not exclusively, plastic or glass.

It is therefore proposed that an electrically operated driving device such as in particular, but not exclusively, an electric motor, in particular a servomotor, is provided which rotates the plastic parisons, in particular for alignment thereof with respect to the longitudinal directions. From the cited electrical characteristic quantity it is preferably possible to draw conclusions concerning proper behaviour of the driving device and thus also about proper rotation. Such a rotating device is advantageously associated with each of the said holding devices. Each driving device advantageously also has a measuring device which determines the said electrical characteristic quantity. In addition, it would also be conceivable to provide a measuring device which is suitable and determined for measurement of each individual driving device.

In a further advantageous embodiment the system has a first heating device which is arranged along the transport path and which heats the plastic parisons during its transport along the transport path. In this embodiment the system is an oven, in particular an infrared oven, which is usually connected upstream of a stretch blow moulding machine and which serves to heat the plastic parisons to a temperature at which a stretch blow moulding process can be carried out.

The system preferably has at least one contacting element arranged downstream with respect to the heating device in order to act on a wall of the plastic parisons with a temperature profile which changes in a circumferential direction and/or longitudinal direction of the plastic parison.

In this case a contact surface of this contacting element advantageously touches a predetermined region of the wall of the plastic parisons delimited in the circumferential direction and/or longitudinal direction of the plastic parisons, in order to act on this region with a different temperature profile relative to a region untouched by the contacting element.

Furthermore, in this case the system has a delivery device which delivers the contacting element in a predetermined direction towards the plastic parison.

Alternatively, it would also be conceivable that a rotation of the plastic parisons is controlled so that specific regions are heated more than others. In this way for example the rotation can be controlled so that in specific rotated positions the plastic parison is retained for a longer period of time in the vicinity of the heating device and thus is heated more intensively.

In a further advantageous embodiment it would be possible, that the system has a first transport section, within which all plastic parisons are uniformly heated, and then a second transport section, within which the plastic parisons are acted upon with a different temperature profile. In this case it is in particular possible that the above-mentioned rotating to device is arranged between these transport sections. In this case it is in particular also possible that on the second transport section at least one second heating device is arranged which heats the plastic parisons during transport thereof along the second transport section. As mentioned above, the container is advantageously a plastic container and in particular a plastic parison. However, the system can also be applied, instead of to containers, to other objects, such as for example closures, which are for example screwed to containers. Therefore, the present invention is also applicable to devices such as blow moulding machines, filling machines, labelling machines and the like. In particular an application of the invention may be considered if a plurality of handling stations are provided and these handling stations in each case have electrical drives, preferably rotary drives, lifting drives or the like.

In a further advantageous embodiment the system has a processor device which, on the basis of the characteristic quantity measured by the measuring device, outputs a signal which enables a conclusion to be drawn as to a rotary movement of the plastic parisons effected by the driving device. Thus, for example from the electrical measured value it can be concluded that a specific driving device is not rotated or only rotated very little, because for example sticking occurs.

In a further advantageous embodiment the machine has at least one comparison device which compares the values measured by the measuring device with at least one comparative value. On the basis of this comparison a conclusion can be drawn as to whether a fault such as for instance sticking is present in the respective driving device. In this case it is possible that these comparative values are stored individually for each individual driving device. Advantageously the system also has a storage device for storing the values measured by the measuring device.

In a further advantageous embodiment the driving device, in particular the electric motor-powered driving device, is designed without an encoder. Thus, the individual driving devices preferably have no so-called rotary encoder. In this way the costs can be reduced.

In a further advantageous embodiment the processor device and/or a control device of the system is designed so that in a specific time period an acceleration of the drive is deliberately generated in order to recognise faults, such as for example sticking, in this phase.

The driving devices described here, such as in particular stepping motors, always rotate further by a specific angle per control step. Thus, however, no encoder signal is necessary for the actual positioning. Thus if, as described here, it is possible to find another method for monitoring the alignment, such as in this case by means of the measurement of the electrical characteristic quantity, the expensive components such as camera encoder or encoder card can be omitted.

The electrical characteristic quantity is preferably selected from a group of characteristic quantities which includes an electrical voltage, an electrical current, an induced voltage, an electromotive force, an electrical resistance or the like. With the aid of these electrical characteristic quantities it is possible to establish whether the motor reaches a desired rotation. In the case of a rotating motor, a voltage, the so-called counter-electromotive force (counter-EMF), which counteracts the applied voltage is induced in the winding of the motor. This counter-EMF is higher, the higher the rotational speed is.

The counter-EMF can be used for control and speed regulation thereof. In this case the difference between the applied voltage and the counter-EMF can preferably be applied to an ohmic resistance of the winding. In this way the winding current is applied. If the applied voltage and also the measured winding current are known, the rotational speed can also be calculated in the reverse direction. In this way a controller can react to this and/or can provide a display to the operator when a fault occurs.

The measuring device is advantageously integrated into an output stage for controlling the drive. Thus, this measuring device serves here for detecting electrical characteristic quantities.

If it is ascertained that a specific drive or a specific station exhibits a shortcoming which for example leads to a stuck mandrel or a stuck holding device, the counter-EMF will drop and the winding current will increase. This increase can be recognised by means of measurement techniques and the controller can react thereto and can display the fault for the operator.

Advantageously the holding devices are mandrels or holding mandrels which can be introduced into the mouths of the plastic parisons.

In a further advantageous embodiment the system has a rotational position detection device which detects a rotational position of the plastic parisons with respect to their longitudinal axis. In this case for example this may be an optical rotational position detection device. This can for example detect the position of a specific marking on the support ring of the plastic parison. On the basis of this detected position it is possible to determine the rotation angle by which each plastic parison is to be further rotated individually, so that a uniform rotational position of all plastic parisons is achieved.

In a further advantageous embodiment the rotating device is an aligning device which aligns the plastic parisons with regard to a rotated position with respect to the longitudinal direction thereof.

In a further advantageous embodiment this aligning device is arranged along a transport path of the plastic parisons between the first transport section and the second transport section.

In a further advantageous embodiment the transport device has a revolving carrier as well as a plurality of holding devices arranged on this carrier. At least one transport section is advantageously designed as a heating alley, through which the plastic parisons are conveyed for heating. In this case it is possible that these holding devices can also carry out lifting movements in order thus to be introduced into the mouths of the plastic parisons.

In a further advantageous embodiment the aligning device has a plurality of electric motor-powered drives for rotation of the plastic parisons with respect to their longitudinal directions.

As mentioned above, a plurality of holding elements or holding devices are provided to hold the plastic parisons. In this way separate transport of the plastic parisons is possible.

Furthermore, the present invention relates to a method for processing containers, wherein the containers are held by a plurality of holding devices and are transported along a predetermined transport path, wherein the containers are rotated by means of a rotating device with regard to a rotated position with respect to its longitudinal direction.

According to the invention the rotating device has an electrically operated driving device for producing the rotary movement of the holding devices with the containers arranged thereon with respect to the longitudinal directions of the containers, and by means of a measuring device at least one electrical characteristic quantity of this driving device is detected at least at times.

The driving devices are advantageously controlled without an encoder, that is to say in particular without a rotary encoder. In this way a cost reduction can also be achieved by the method.

It is therefore also proposed by the method that a fault in the drives is detected, in particular, by means of the electrical characteristic quantity. Preferably, therefore, on the basis of the electrical characteristic quantity it is determined whether the driving device has generated or carried out a desired rotary movement.

In a further preferred method the electrical variable is determined while the driving device is operating at a high rotational speed. In this case in particular speeds between 300 and 1500 rpm, preferably between 400 and 1200 rpm and particularly preferably between 500 and 1000 rpm are involved. Since the counter-EMF increases with a rising rotational speed, the diagnosis described above is preferably carried out at a high rotational speed, since the detection is then more precise and the risk of leading to false alarms is minimised. Advantageously in this case, however, this diagnosis is not carried out during the actual stamping operation or the operation in which the plastic parisons are tempered.

The electrical characteristic quantity of the driving device is advantageously detected at least at times in a time period in which no container is located on the holding device associated with the driving device. The containers are usually delivered to the heating device by means of a delivery starwheel, then are heated during their transport by the transport device and finally are discharged in a heated state. Since, as mentioned above, this preferably involves a revolving transport means, there is a certain intermediate region in which no plastic containers are located on the holding devices. The measurements described here are preferably carried out within this section.

In this case the said test preferably takes place in a region between a discharge starwheel and an infeed starwheel if the plastic parison has just been removed and a new plastic parison has not yet been added. Thus, the measuring devices preferably carry out measurements in an unoccupied state of the individual holding devices. In this region the holding device, for example the holding mandrel, can be very quickly accelerated to a high speed and also immediately decelerated again. During this operation sticking of the holding device is preferably monitored by the described method.

Further advantages and embodiments are apparent from the appended drawings. In the drawings:

FIG. 1 shows a schematic representation of a system for heating plastic parisons.

FIG. 1 shows a schematic representation for illustration of the present invention. It is pointed out that not all of the features illustrated in the drawings are essential for the invention. This is also an exemplary representation. As stated above, the invention could also be used on other devices, in particular those devices having a plurality of rotary drives which for example also rotate containers such as bottles. In this case the reference sign 1 relates to the system for heating plastic parisons 10. In this case this system 1 has a transport device 2, along which the plastic parisons 10 are transported, more precisely they are transported along the transport path P.

For this purpose, the plastic parisons 10 are initially fed in by means of a delivery channel 32 and a synchronisation starwheel 34, they then run through the transport device 2 and finally are taken up by a transfer starwheel 36 and are transferred to a blow moulding machine (not shown). In this case the transport path P has a first transport section 22 and a second transport section 24. An aligning device 6 can be arranged between these two transport sections 22 and 24 for alignment of the individual plastic parisons. There are usually no heating elements arranged in this region of the system. In the embodiment illustrated in FIG. 1 a so-called preferential heating of the plastic parisons takes place. However, it would also be conceivable that the system heats the plastic parisons uniformly and only after this heating, as set out above, specific regions of the plastic parisons are tempered, for example cooled. In this case the aligning device could be located downstream of the system 1.

A plurality of first heating devices 4 is arranged along the first transport section 22, and a plurality of second heating devices 8 is arranged on the second transport section 24. These heating devices can be in particular infrared heating elements, for instance tubes, which extend section by section along the transport path of the plastic parisons.

It will be seen from the small arrows that during the transport along the first transport section the plastic parisons are also rotated with respect to their longitudinal axis. Such a rotation of the plastic parisons also takes place in the region of the second transport section. However, in the region of the first transport section 22 a uniform rotation of the plastic parisons takes place, i.e. they are heated uniformly in the circumferential direction and in the region of the second transport section 24 a non-uniform rotation takes place, so that the plastic parisons are heated non-uniformly in a circumferential direction with respect to the longitudinal direction of the plastic parisons. The reference sign 80 designates a holding device which serves for holding the plastic parisons. In FIG. 1 the longitudinal direction of the plastic parisons extends perpendicularly to the drawing. This holding device can have a mandrel (not shown) which can be introduced into the mouths of the plastic parisons. This mandrel can also have (in particular switchable) clamping means, which cause the plastic parisons to be held at least temporarily on the holding mandrel.

The reference signs 16 relate to driving devices, which serve for rotationally driving the plastic parisons or the holding devices thereof. In this case such a driving device 16 is associated with each holding device, so that the individual holding devices can rotate individually. The driving devices 16 can be in particular electric motors and in particular servomotors.

The reference sign 12 designates very schematically a detection device which detects a rotational position of the individual plastic parisons 10. This is preferably an optical detection device, such as for instance a camera which records images of the plastic parisons. A current rotational position of the individual plastic parisons can be inferred on the basis of these images. In reaction to the rotational position of the plastic parisons thus detected, an instruction can be output to the relevant driving device concerning the angle by which the relevant holding device and thus the plastic parison arranged on this relevant holding device is to be rotated.

The reference sign 18 designates very schematically a measuring device which determines at least one electrical characteristic quantity of the individual driving devices. The reference sign 20 designates a processor device which, on the basis of the data measured by the measuring device, determines whether the driving device has carried out a specific desired rotation and/or is capable of carrying out specific nominal rotations of the holding devices and/or of the plastic parisons arranged thereon. In this case in particular the processor device compares the electrical values determined by the measuring device with target variables, for instance in order to determine a rotational speed of the driving device therefrom. However, it may also be sufficient to determine not the precise rotational speed of the driving devices but merely to state whether or not the driving device is rotating properly.

The reference A designates a region along the transport path of the plastic parisons 10 in which the measuring device preferably determines the electrical characteristic quantity. In the region designated by A the individual holding devices are not equipped with plastic parisons 10, since in this region the heated plastic parisons have been passed on to the transfer starwheel and new plastic parisons have not yet been taken up.

In this region A the holding devices, for example holding mandrels, are accelerated to a high rotational speed and then decelerated again. In this phase the electrical characteristic quantities such as for instance the counter-EMF are measured. In this case it is possible that the measurement is carried out in each rotation of the holding devices. However, it would also be conceivable to carry out the measurement only in specified time intervals or depending upon an operational situation, for instance after start-up the machine.

The individual measurements are preferably performed individually for each individual driving device.

The applicant reserves the right to claim all the features disclosed in the application documents as essential to the invention in so far as they are individually or in combination novel over the prior art. Furthermore, it is pointed out that in the individual drawings features were also described which may be advantageous per se. The person skilled in the art recognises immediately that a specific feature described in a drawing may also be advantageous without the incorporation of further features from this drawing. Furthermore, the person skilled in the art recognises that advantages may also result from a combination of several features shown in individual drawings or in different drawings.

LIST OF REFERENCE SIGNS 1 system
2 transport device
4 first heating devices
6 aligning device
8 second heating devices
10 plastic parisons
12 detecting device
16 driving device
18 holding element
22 first transport section
24 second transport section/heating section
32 delivery channel
34 synchronisation starwheel
36 transfer starwheel
80 holding device, spindle
A measurement region
T transport path

The invention claimed is:

1. System for processing containers with a transport device which transports the containers along a predetermined transport path, wherein a plurality of holding devices for holding the containers is arranged on the transport device, wherein the system has at least one rotating device which rotates the plastic parisons with regard to a rotational position with respect to the longitudinal directions thereof, characterised in that the rotating device has an electrically operated driving device for producing the rotary movement of the plastic parisons with respect to the longitudinal directions thereof as well as at least one measuring device, which at least at times determines at least an electrical characteristic quantity of this driving device, wherein
the electronic characteristic quantity is determined while the driving device is operating at a high rotational speed.

2. System according to claim 1, wherein the device has a first heating device which is arranged along the transport path and which heats the plastic parisons during its transport along the transport path.

3. System according to claim 1, wherein the system has a processor device which, on the basis of the characteristic quantity measured by the measuring device, outputs a signal which enables a conclusion to be drawn to a rotary movement of the plastic parisons effected by the driving device.

4. System according to claim 1, wherein the driving device is designed without an encoder.

5. System according to claim 1, wherein the electrical characteristic quantity is selected from a group of characteristic quantities which includes an electrical voltage, an electrical current, an induced voltage, an electromotive force, a counter-electromotive force, an electrical resistance or the like.

6. System according to claim 1, wherein the system has a rotational position detection device which detects a rotational position of the plastic parisons with respect to their longitudinal axis.

7. System according to claim 1, wherein the aligning device has a plurality of motor-powered drives for rotating the plastic parisons with respect to their longitudinal direction.

8. System according to claim 1, wherein the system has a plurality of holding devices for holding the plastic parisons.

9. Method for processing containers, wherein the containers are held by a plurality of holding devices and are transported along a predetermined transport path, wherein the containers are rotated by means of a rotating device with a regard to a rotational position with respect to the longitudinal direction thereof, characterised in that the rotating device has an electrically operated driving device for producing the rotary movement of the holding devices with the containers arranged thereon with respect to the longitudinal directions of the containers, and by means of a measuring device at least one electrical characteristic quantity of this driving device is detected at least at times, wherein the electronic characteristic quantity is determined while the driving device is operating at a high rotational speed.

10. Method according to claim 9, wherein, on the basis of the electrical characteristic quantity it is determined whether the driving device has generated a desired rotary movement.

11. Method according to claim 9, wherein the electrical characteristic quantity of the driving device is detected at least at times in a time period in which no container is located on the holding device associated with the driving device.

* * * * *